(12) United States Patent
Hamilton et al.

(10) Patent No.: US 11,293,758 B2
(45) Date of Patent: Apr. 5, 2022

(54) SYSTEMS AND METHODS FOR INCREASING THE ACCURACY OF VEHICLE POSITIONING

(71) Applicant: Ford Global Technologies, LLC, Dearborn, MI (US)

(72) Inventors: Brennan Hamilton, Birmingham, MI (US); John Cardillo, Windsor (CA); Krishna Bandi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 16/420,029

(22) Filed: May 22, 2019

(65) Prior Publication Data
US 2020/0370890 A1 Nov. 26, 2020

(51) Int. Cl.
| | | |
|---|---|---|
| G01C 21/16 | (2006.01) | |
| H04W 4/40 | (2018.01) | |
| G08G 1/01 | (2006.01) | |
| G08G 1/017 | (2006.01) | |

(52) U.S. Cl.
CPC ......... G01C 21/165 (2013.01); G08G 1/0112 (2013.01); G08G 1/0175 (2013.01); H04W 4/40 (2018.02)

(58) Field of Classification Search
CPC .. G01C 21/165; G08G 1/0122; G08G 1/0175; H04W 4/40; H04W 4/02; H04W 4/44
See application file for complete search history.

(56) References Cited

U.S. PATENT DOCUMENTS

| | | | | |
|---|---|---|---|---|
| 7,466,992 | B1 * | 12/2008 | Fujisaki | H04W 4/029 |
| | | | | 455/556.1 |
| 9,103,671 | B1 * | 8/2015 | Breed | G01S 13/931 |
| 9,568,592 | B1 * | 2/2017 | Brown | G01S 7/4026 |
| 9,651,659 | B2 * | 5/2017 | Vinski | G01S 13/74 |
| 9,970,615 | B1 | 5/2018 | Cardillo et al. | |

(Continued)

FOREIGN PATENT DOCUMENTS

| | | | |
|---|---|---|---|
| CN | 202748846 U | 2/2013 | |
| CN | 105809752 A | 7/2016 | |
| WO | WO-2017045139 A1 * | 3/2017 | ....... G08G 1/096758 |

OTHER PUBLICATIONS

Khattab, et al., "High Accuracy GPS-Free Vehicle Localization Framework via an INS-Assisted Single RSU," International Journal of Distributed Sensor Networks, May 5, 2015, vol. 11, No. 5, pp. 1-16. doi: 10.1155/2015/795036.

*Primary Examiner* — Geepy Pe
*Assistant Examiner* — Daniel Tyler Reich
(74) *Attorney, Agent, or Firm* — Brandon Hicks; Eversheds Sutherland (US) LLP

(57) ABSTRACT

Systems, methods, and computer-readable media are directed to increasing the accuracy of vehicle positioning. Example methods may include transmitting, by an on-board unit, a message including a motion information associated with the vehicle; determining, by a processor, a signal comprising modulating radiation, the signal identifying the vehicle; receiving, by the on-board unit, an additional message, the additional message including location information and a timestamp; and determining a location of the vehicle based on the location information.

17 Claims, 7 Drawing Sheets

(56) References Cited

U.S. PATENT DOCUMENTS

2012/0310516 A1* 12/2012 Zeng .................. G01S 19/46
701/300
2018/0292513 A1* 10/2018 Bidner .................. G01S 17/58

* cited by examiner

SYSTEMS AND METHODS FOR INCREASING THE ACCURACY OF VEHICLE POSITIONING

TECHNICAL FIELD

The present disclosure relates to systems and methods for vehicle positioning, and more specifically, to methods and systems for increasing the accuracy of vehicle positioning.

BACKGROUND

Positioning systems such as global navigation satellite systems (GNSS) can be used in navigation and guidance applications in a variety of fields such as agriculture, transportation, mining and logistics. In some situations, connected vehicles, autonomous vehicles (AVs) may need to travel in areas where absolute positioning systems may be unreliable. For example, a positioning system may have errors due to obstructions of the signals between a transmitter and the receiver of the positioning system. For a receiver at or near ground level, trees, buildings and other obstructions may contribute to the loss of such signals. Accordingly, positioning systems may have difficulty in providing accurate position data in certain environments such as urban canyons, tunnels, dead spots, and the like.

DETAILED DESCRIPTION

Figure 1:
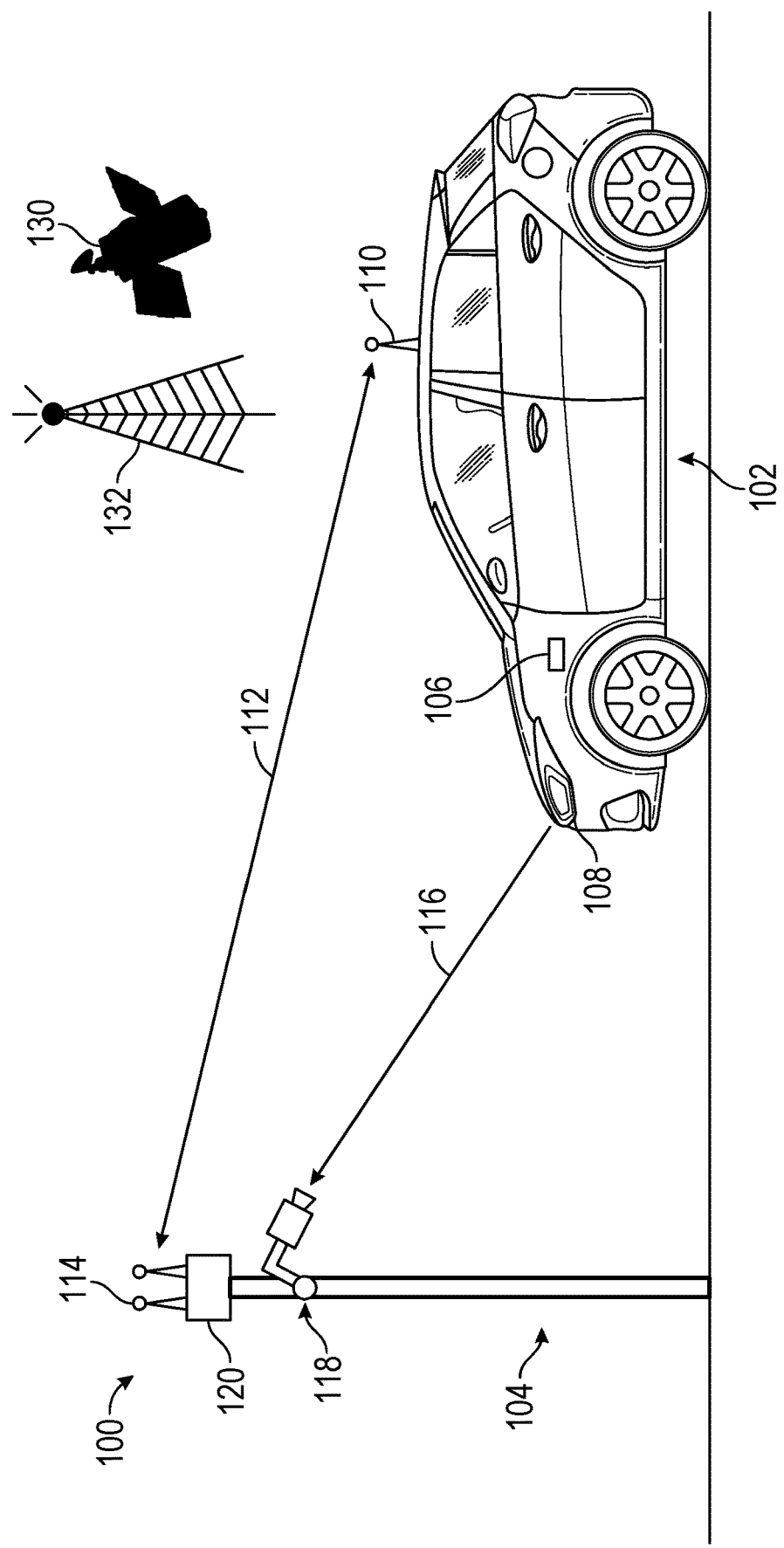
FIG. 1 shows a diagram of an environmental context for increasing the accuracy of vehicle positioning, in accordance with example embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used herein, a "communication system" can refer to a computer network in which vehicles and roadside units serve as communicating nodes, providing each other with information, such as safety warnings and traffic information. These components can be used in avoiding accidents and in reducing traffic congestion. The components may include dedicated short-range communications (DSRC) devices and/or cellular V2X (C-V2X). DSRC can refer to one-way or two-way short-range to medium-range wireless communication channels specifically designed for automotive use and a corresponding set of protocols and standards.

As used herein, "vehicle-to-everything" (V2X) communication may refer to the communication of information between a vehicle and any entity that may affect the vehicle. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). In some aspects, V2X communication technology can include wide local area network (WLAN)-based and cellular-based communications. V2X communication that uses cellular networks can be referred to as "cellular V2X" (or C-V2X) herein to differentiate it from other network-based V2X communication (for example, WLAN-based V2X communication). In some examples, C-V2X can use long-term evolution (LTE) (and its variants) as described, for example, in 3GPP standards Release 14. Moreover, V2X functionalities can support 5G, as described in connection with various standards, such as 3GPP Release 15.

As used herein, a "basic safety message," (BSM) can refer to a wireless message in vehicle-to-vehicle (V2V) applications. The BSM may include a low latency, localized broadcast that can be used in connection with V2V safety applications. Such V2V safety applications can be built around any suitable standard, such as a society of automotive engineers (SAE) J2735 BSM standard. In some examples, the BSM may include a first portion having vehicle data elements (vehicle size, position, speed, heading acceleration, brake system status, and/or the like), and this portion can be transmitted approximately ten times per second. In other examples, the BSM may include a second portion having a variable set of data elements drawn from optional data elements, whose availability by vehicle model can vary. This second portion may be transmitted less frequently as compared with the first portion. In some cases, the BSM can be transmitted using any suitable technique, such as V2X technologies (e.g., DSRC C2VX, and the like) and may have a range of about 1,000 meters.

As used herein, "vehicle detection" can refer to a process whereby video from a camera can be inputted to processors that analyze the changing characteristics of the video image as vehicles pass by the camera. The camera may be mounted on suitable infrastructural components (for example, poles or structures above or adjacent to a roadway). In some examples, video detection systems can include initial configuration to train various algorithms (for example, machine-learning algorithms) executed by a processor to obtain a baseline background image. For example, known measurements such as the distance between lane lines or the height of the camera above the roadway can be inputted. A processor can detect traffic simultaneously from a plurality of cameras. The typical output from a video detection system can include lane-by-lane vehicle speeds, counts, and lane occupancy readings. In some examples, vehicle detection systems can provide additional outputs including, but not limited to, gap, headway, stopped-vehicle detection, wrong-way vehicle alarms, and the like.

As used herein, an "on-board unit" may refer to an embedded system including a controller programmed and controlled by a real-time operating system (RTOS) with a dedicated function within a larger mechanical or electrical system, which may also have real-time computing constraints. It may include a GNSS unit, which can keep track of the latitude and longitude values of the vehicle; an external interface for mobile communication (for example, Wi-Fi or LTE), which provides the tracked values to a centralized geographical information system (GIS) database server; an electronic processing unit; a microcontroller, in some versions; a microprocessor or field programmable gate array (FPGA), which processes the information and may act on the interface between the GNSS; a mobile communication unit; and memory for saving GNSS values in case of mobile-free zones or to store information about the vehicle's sensor data.

As used herein, "satellite navigation" may refer to a system that uses satellites to provide autonomous geo-spatial positioning. It allows small electronic receivers to determine their location (longitude, latitude, and altitude/elevation) to a relatively high precision (within a few meters) using time signals transmitted along a line of sight by radio from satellites. The system can be used for providing position, navigation or for tracking the position of something fitted with a receiver. The signals also allow the electronic receiver to calculate the current local time to a relatively high precision, which can allow time synchronization. Satellite navigation systems may operate independently of any telephonic or internet reception.

As used herein, an "infrastructural component" may include road and highway networks, including structures (bridges, tunnels, culverts, retaining walls), signage and markings, electrical systems (street lighting and traffic lights), and/or the like.

As used herein, "non line of sight" (NLOS) can refer to radio transmissions across a path that is partially obstructed, usually by a physical object. Many types of radio transmissions depend, to varying degrees, on line of sight (LOS) between a transmitter and receiver. Obstacles that commonly cause NLOS conditions include buildings, trees, hills, mountains, and, in some cases, high voltage electric power lines. Some of these obstructions may reflect certain radio frequencies, while some simply absorb or garble the signals. The obstructions may limit the use of many types of radio transmissions.

As used herein, "multipath" can refer to radio propagation that results in radio signals reaching the receiving antenna by two or more paths. Causes of multipath may include atmospheric ducting, ionospheric reflection and refraction, reflection from water bodies and terrestrial objects such as mountains and buildings, and the like. Multipath can cause multipath interference, including constructive and destructive interference, and phase shifting of signals. Destructive interference can cause fading.

Overview

Location determination devices and associated processors (for example, GNSS chipsets) can be used in electronic devices including, but not limited to, smartphones and tablets. These devices may be used for performing satellite navigation. However, the positioning accuracy of consumer-grade location determination receivers (for example, GNSS receivers) may not be accurate enough for certain applications. Further, improvements in clock, orbit, and atmospheric models have increased ranging accuracy to about a meter. This improved ranging accuracy may in turn increase the role of receiver-dependent inaccuracies (for example, multipath and front-end-noise-induced variations) as a source of error in consumer devices. For example, under average multipath conditions, a positioning accuracy of 2 to 3 meters may be observed. However, under more extreme multipath conditions, accuracy may degrade to about 10 meters or more.

As noted, the positioning accuracy of consumer-grade location determination receivers (for example, GNSS receivers) may not be accurate enough for certain applications. For example, positioning accuracy may need to be relatively high in V2X safety applications that rely on the locations and trajectories of nearby vehicles to identify threats and trigger timely safety warnings. For these applications to be dependable, reliable positions may need to be accurate to within a vehicle lane (for example, about 1.5 meters with a confidence of about 95%). Conventional systems may not be able to provide this level of accuracy in NLOS and/or multi-path environments (for example, urban canyons, tunnels, and/or dead spots). In particular, conventional GNSS receivers may not be able to meet the positional accuracy of about 1.5 meters about 68% of the time in certain locations such as urban canyons, tunnels, and/or dead spots. This can be due to NLOS satellites view, multipath effects, and/or the like. Other conventional techniques, including, but not limited to, time difference of arrival (TDOA), map matching, street-light communication, received signal strength (RSS), angle of arrival (AoA), dead reckoning, and the like may not be able to provide sufficient time of readiness and 1.5 meter position accuracy for a given price point. Accordingly, conventional systems may not be capable of offering sufficient positional accuracy that may be critical for certain applications such as in safety-related technologies like V2X communications.

The disclosed systems can increase the positioning accuracy of a vehicle in NLOS environments. In some examples, the disclosed systems can use a road-side camera to capture images (for example, video data) of a vehicle and an optical device such as a modulated-light source to transmit identifying information from the vehicle to a roadside unit in an infrastructural component. The disclosed systems may use the image data to determine the position of the vehicle at a point in time and then transmit that data with the identifying data to the vehicle for use by the vehicle location system in determine its current location. Further, the disclosed systems can communicate using a connected vehicle based standard such as a V2X communications standard. In some examples, a vehicle can be equipped with an on-board unit (for example, a V2X-based on-board unit) that can control the optical device. Further, the disclosed systems can be in communication with transportation infrastructure including cameras, processing devices, and roadside units that can be used for V2X communications.

In some examples, the camera may be installed on the transportation infrastructure such that the camera may have a view of vehicles (for example, vehicles travelling on a street). When a vehicle comes into the field of view of the camera, various communications can occur. The disclosed systems can cause the vehicle's on-board unit to initiate communications with the roadside unit. For example, a modulated-light source of the vehicle can encode a unique identifier, such as a BSM-based temporary identifier. The vehicle can transmit a V2X message to the roadside unit using any suitable communications standard (for example, using V2X communications standard).

Moreover, the disclosed systems can cause the vehicle's optical device to broadcast the modulated light. For example, the optical device of the vehicle may include a headlamp of the vehicle, and the disclosed systems can cause the optical device to transmit modulated radiation in a particular frequency range (for example, a frequency range that may be undetectable by the human eye). The camera of the roadside unit may be configured to detect the modulated radiation, for example using a suitable computer-based algorithm. Further, the modulated radiation may uniquely identify information associated with the vehicle. Such information may include, but not be limited to, a vehicle identification number (VIN), a vehicle make or model, and/or the like.

The disclosed systems can cause the roadside unit to receive and process the communications generated by the vehicle's on-board unit. In particular, the infrastructure-based camera can capture a timestamped image of sequence of images (for example, a video) of the vehicle in the field of view of the camera. The roadside unit can receive the vehicle's messages sent using V2X communication protocols. The disclosed systems can cause processors of the roadside unit to process the images of the vehicle. As noted, the processors can perform any suitable computer-based algorithm (for example, a computer-vision algorithm and/or a machine-learning algorithm) to detect vehicle information transmitted by the vehicle's modulated light source. In some examples, the disclosed systems can decode the vehicle's identifier by demodulating the signals transmitted via the optical device and detected in the camera images. In some examples, the demodulation can be performed using, for example, a Fourier transform of the images. In some examples, a Fourier transform can decompose a function of time (a signal) into its constituent frequencies for further analysis by various computer-implemented algorithms by the disclosed systems. In some examples, the frame rate of the camera may be adjusted to obtain a sampling rate that is commensurate with the level of detail needed for performing any such Fourier transforms.

Further, the disclosed systems can determine the vehicle's position using image data, road geometry, and the vehicle's geometry. For example, the disclosed systems can make fine adjustments to a vehicle's position based on the vehicle's shape. For example, in case the vehicle is a truck that has a length of about 25 meters, the disclosed systems can provide an average location of the center of the vehicle or the front of the vehicle, which may be slightly different that the location provided by a GNSS signal, which may correspond with the location of a GNSS antenna. Alternatively or additionally, the disclosed systems may make adjustments to the vehicle's position based on the relationship between the image and the known configuration of the roads to correct for distortions in the captured image data. For example, if the camera has certain optical distortions that cause the location estimation of the vehicle to be different than the actual location of the vehicle, the disclosed systems may be calibrated to make relevant adjustments. In some cases, the position can be corrected, for example, at the roadside unit that is remote from the vehicle. In particular, the disclosed systems may analyze pixels of a given frame of a timestamp video to determine the presence of the vehicle at a location as cross-referenced to internally-stored data. The internally-stored data may include pre-mapped coordinates associated with locations videoed by camera. By cross-referencing the frames of the timestamp video with the pre-mapped coordinates associated with the locations, the disclosed systems may be able to determine a vehicle's location at a particular time indicated by the timestamp. The determined location can be transmitted to the vehicle to update its internal record of its location.

In some examples, the determination of the vehicle's position may be improved by using the BSM-based messages transmitted by the vehicle. For example, basic vehicle class information mentioned in a SAE-J2735_201603 standard and transmitted in the BSM can be used to increase the accuracy of the determination of the vehicle's position. As noted, the vehicle class information may provide information about the dimensions of the vehicle, and in the case of a particularly large vehicle (e.g., a truck) may allow the disclosed systems to better estimate the location of a portion of the vehicle (e.g., the center of the vehicle, the front of the vehicle, etc.). In some examples, the disclosed systems can use a processor of an infrastructural component to send the determined vehicle position to the roadside unit (e.g., via a V2X message) for further transmission to other upstream devices and/or networks that are in communication with the infrastructure. For example, such upstream devices may include a data center that is monitoring a portion of a city having the infrastructure, and the data center may be in communication with infrastructure for monitoring purposes. Alternatively or additionally, the upstream device may include a user device running an application that can be provided with the location information from the roadside unit, for example, to enable location-based services on the user device. In some aspects, the disclosed systems can enable transportation infrastructure transmissions to vehicles. In particular, the disclosed system can enable infrastructure components to transmit a vehicle's timestamped positions back to the vehicle, for example, via messages transmitted in accordance with a V2X communication protocol (or any other suitable communications protocol).

The disclosed systems can enable the vehicle to receive the infrastructure transmissions using a V2X communication protocol and process the V2X messages with the on-board unit of the vehicles. Further, the on-board unit can extract the positional information and timestamp information for the vehicle from the V2X messages (e.g., by removing header information and processing the data fields of the V2X message). The disclosed systems can use the timestamped position information to improve the vehicle's location-determination accuracy. For example, the onboard unit can extrapolate the timestamped information and location based on the heading and speed information of the vehicle over the time interval to determine the present location of the vehicle. If this present location is different than the GNSS-based location of the vehicle, the vehicle can determine a correction factor (e.g., a ratio between the actual present location and the GNSS-based location), and apply the correction factor to the GNSS-based location for a predetermined duration of time (e.g., several seconds or minutes). Accordingly, the disclosed systems can improve accuracy, reliability, and availability of the location-determination process through the integration of external information into the calculation process.

Example Embodiments

FIG. 1 shows a diagram of an environmental context for increasing the accuracy of vehicle positioning, in accordance with example embodiments of the disclosure. FIG. 1 represents an environmental context 100 that includes vehicle 102 and infrastructural component 104. Further, the vehicle 102 may include an on-board unit 106, a modulated-light source 108, and a vehicle antenna 110. The infrastructural component 104 may include an antenna 114, a camera 118, and a roadside unit 120 including a processor. The vehicle antenna 110 may communicate messages (e.g., V2X messages) to and from the antenna 114 of the infrastructural component 104. The modulated-light source 108 may broadcast modulated light 116, which can be detected by the camera 118 of the infrastructural component 104.

The vehicle 102 may include any suitable vehicle such as a motorcycle, car, truck, recreational vehicle, etc., and may be equipped with suitable hardware and software that enables it to communicate over a network, such as a local area network (LAN). In one embodiment, the vehicle 102 may include an AV.

In another embodiment, the vehicle 102 may include a variety of sensors that may aid the vehicle in navigation, such as radio detection and ranging (RADAR), light detection and ranging (LIDAR), cameras, magnetometers, ultrasound, barometers, and the like (to be described below). In one embodiment, the sensors and other devices of the vehicle 102 may communicate over one or more network connections. Examples of suitable network connections include a controller area network (CAN), a media-oriented system transfer (MOST), a local interconnection network (LIN), a cellular network, a Wi-Fi network, and other appropriate connections such as those that conform with known standards and specifications (e.g., one or more Institute of Electrical and Electronics Engineers (IEEE) standards, and the like).

In some examples, the vehicle 102 may include a satellite-based location-determination device that may be configured to determine the location of the vehicle using standard GNSS signals. The location-determination device may include outdoor positioning aspects, such as a location module adapted to acquire, for example, latitude, longitude, altitude, geocode, course, direction, heading, speed, universal time (UTC), date, and/or various other information/data. In one embodiment, the location-determination device can acquire data, sometimes known as ephemeris data, by identifying the number of satellites (e.g., satellite 130, discussed below) in view and the relative positions of those satellites. Alternatively, the location information can be determined by triangulating the vehicle 102's position in connection with a variety of other systems, including cellular towers (e.g., cellular tower 132), Wi-Fi access points, and/or the like. In some examples, the location-determination device may include the capability to detect location signals from other location-determination systems, for example, to increase the location accuracy determination. For example, the location device may be configured to receive one or more location signals from a Russian global navigation satellite system (GLONASS), a Chinese BeiDou navigation satellite system, a European Union Galileo positioning system, an Indian regional navigation satellite system (IRNSS), and/or a Japanese quasi-zenith satellite system, and the like.

In some examples, the vehicle 102 may include various location-determination devices in addition to satellite-based location-determination devices. For example, the vehicle 102 may include magnetic positioning devices such as magnetometers, which may offer an indoor location determination capability. Magnetic positioning may be based on the iron inside buildings that create local variations in the Earth's magnetic field. Un-optimized compass chips inside devices in the vehicle 102 may sense and record these magnetic variations to map indoor locations. In one embodiment, the magnetic positioning devices may be used to determine the elevation of the vehicle 102. Alternatively or additionally, a barometer device may be used to determine the elevation of the vehicle 102. In another embodiment, barometers and pressure altimeters may be a part of the vehicle and may measure pressure changes caused by a change in altitude of the vehicle 102.

In one embodiment, the vehicle 102 may use one or more inertial measurement devices (not shown) to determine the vehicle's position. The vehicle 102 may use dead reckoning and other approaches for positioning of the vehicle using an inertial measurement unit carried by the vehicle 102, sometimes referring to maps or other additional sensors to constrain the inherent sensor drift encountered with inertial navigation. In one embodiment, one or more microelectromechanical systems (MEMS) based inertial sensors may be used in the inertial measurement unit of the vehicle 102; however, the MEMS sensors may be affected by internal noises which may result in cubically growing position error with time. In one embodiment, to reduce the error growth in such devices, a Kalman filtering based approach may be used, by implementing software algorithms on software modules associated with the various devices in the vehicle 102.

In one embodiment, the inertial measurements may cover one or more differentials of motion of the vehicle 102, and therefore, the location may be determined by performing integration functions in the software modules, and accordingly, may require integration constants to provide results. Further, the position estimation for the vehicle 102 may be determined as the maximum of a two-dimensional or a three-dimensional probability distribution which may be recomputed at any time step, taking into account the noise model of all the sensors and devices involved. Based on the vehicle's 102 motion, the inertial measurement devices may be able to estimate the vehicle's 102 locations by one or more artificial intelligence algorithms, for example, one or more machine learning algorithms (e.g., convolutional neural networks). The disclosed systems may use any of the devices mentioned above in combination with the location-determination signals provided by the disclosed embodiments to improve the accuracy of positioning the vehicle.

In some examples, the infrastructural component 104 may use markers that may be placed at specific locations throughout the environment neighboring the infrastructural component 104. The markers may encode that location's coordinates: latitude, longitude, and/or elevation. The disclosed systems can identify the markers from the video captured by the cameras and compare the markers with the portions of the video that depict the vehicles. Accordingly, the disclosed systems can build an association between the markers and the vehicles to determine a given vehicle's position. This association can be used to determine the exact position of the vehicle from images of the vehicle with respect to the markers, as determined, for example, by any suitable computer-vision algorithm.

In one embodiment, the infrastructural component 104 may include cameras that may determine the vehicle 102's location based on visual features of the vehicle 102. For example, the visual features may be used to identify the vehicle and/or to determine the geometry of the vehicle (e.g., a long truck versus a small compact sedan). The geometry of the vehicle may be used to correctly position the vehicle after identification. In some examples, a collection of successive snapshots from an infrastructural component's 104 camera 118 can build a database of images that is suitable for estimating vehicle 102's location. In one embodiment, once the database is built or during the building of such a database, the infrastructural component's 104 camera 118 may take snapshots that can be interpolated into the database, yielding location coordinates.

In some cases, the vehicle 102 may be travelling through a tunnel, a covered parking garage, or other environment where GNSS signals may not be available. In such cases, the disclosed systems can use an indoor positioning system (IPS) in connection with certain infrastructural components 104 to determine the location of the vehicle 102. The IPS may be used in addition to the image-based location determination (e.g., using cameras of the infrastructural components), for example, to provide a backup source of location determination or to improve the accuracy of the image-based techniques. For example, the locations determined by IPS-based techniques and image-based techniques can be averaged or weighed and then averaged to obtain a more accurate vehicle location. In some examples, an IPS may refer to a system to locate objects (e.g., the vehicle 102) inside a building such as a parking structure using lights, radio waves, magnetic fields, acoustic signals, or other sensory information collected by mobile devices (e.g., user devices or vehicle devices). IPS's may use different technologies, including distance measurement to nearby anchor nodes (nodes with known fixed positions, e.g. Wi-Fi and/or Li-Fi access points or Bluetooth® beacons, magnetic positioning, and/or dead reckoning). Such IPSs may actively locate mobile devices and tags associated with the vehicle, or may provide ambient location or environmental context for devices to get sensed. In one embodiment, an IPS system may determine at least three independent measurements are to unambiguously find a location of a given vehicle 102.

In one embodiment, Li-Fi may refer to a technology for wireless communication between devices (e.g., a vehicle's 102 optical device, such as modulated-light source 108 and a camera 118 of infrastructural component 104) using light to transmit data (e.g., heading information of the vehicle, identifying information of the vehicle, speed information of the vehicle, and position information of the vehicle, etc.). In one embodiment, an LED lamp (for example, a vehicle's headlights or taillights or a separate device) can be used for the transmission of visible light. In one embodiment, Li-Fi may be part of an optical wireless communications (OWC) technology in infrastructural component 104 that may use light from light-emitting diodes (LEDs) as a medium to deliver networked, mobile, high-speed communication in a similar manner to Wi-Fi. In an aspect, Li-Fi may have the advantage of being useful in electromagnetic sensitive areas such as closed parking structures without causing electromagnetic interference. In one embodiment, both Wi-Fi and Li-Fi transmit data over the electromagnetic spectrum, but whereas Wi-Fi may use radio waves, while Li-Fi may use visible light, ultraviolet and/or infrared light.

In some examples, the on-board unit 106 may include microcontrollers and devices that can communicate with each other in applications without a host computer. The on-board unit 106 may use a message-based protocol to perform internal communications. Further, the on-board unit 106 can cause a transceiver to send and receive message (for example, V2X messages) to and from infrastructural component 104. Additionally, the on-board unit 106 can configure the modulated-light source 108 to modulate light in a predetermined pattern to allow for communications with the infrastructural component 104. It is to be understood that while diagram 200 illustrates an on-board unit 106, the example operations above can be performed remotely at an external device (e.g., a server in communication with the vehicle 102).

The modulated-light source 108 may include an optical device that is capable of modulating light. Modulation can refer to the process of varying one or more properties of a periodic waveform, called the carrier signal, with a modulating signal that typically contains information to be transmitted (for example, the vehicle's identifying information). In some examples, the modulated-light source 108 may include a spatial light modulator (SLM), an object that imposes some form of spatially varying modulation on a beam of light. In some examples, the SLM can modulate the intensity of the light beam. However, it is also possible to produce devices that modulate the phase of the beam or both the intensity and the phase simultaneously. In other examples, the modulation may include an optical orthogonal frequency-division multiplexing (O-OFDM) modulation method which may be optimized for data rates, multiple-access and energy efficiency via the vehicle 102's front and back lights to increase road safety.

In some examples, the vehicle antenna 110 may include any suitable communications antenna. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the vehicle 102.

Further, various devices of the vehicle 102 and/or the infrastructural component 104 may include any suitable radio and/or transceiver for transmitting and/or receiving radio frequency (RF) signals in the bandwidth and/or channels corresponding to the communications protocols utilized by any of the vehicle devices to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth®, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when the vehicle 102 establishes communication with an infrastructural component 104 device, the vehicle 102 may communicate in the downlink direction by sending data frames (e.g., a data frame which can comprise various fields such as a frame control field, a duration field, an address field, a data field, and a checksum field). The data frames may be preceded by one or more preambles that may be part of one or more headers. These preambles may be used to allow the user device to detect a new incoming data frame from the vehicle device. A preamble may be a signal used in network communications to synchronize transmission timing between two or more devices (e.g., between the vehicle 102 device and infrastructural component 104 device). If the communication is performed in reverse, that is, from the infrastructural component 104 to the vehicle 102 device, the data frames may be sent in the opposite direction.

In another aspect, the environmental context 100 may include one or more satellites 130 and one or more cellular towers 132. As noted, the vehicle 102 may include a transceiver as part of or in addition to onboard unit 106, which may in turn may include one or more location receivers (e.g., GNSS receivers) that may receive location signals (e.g., GNSS signals) from one or more satellites 130. In another embodiment, a receiver may refer to a device that can receive information from satellites (e.g., satellites 130) and calculate the vehicle's 102 geographical position. Using suitable software, the vehicle may display the position on a map displayed on a human-machine interface (HMI), and the receiver may offer information corresponding to navigational directions.

In another embodiment, a user device (e.g., a smart phone) may also have GNSS capability that may be used in conjunction with the receiver, for example, to increase the accuracy of calculating the vehicle's 102 geographical position. In some examples, the disclosed systems may use the user devices within the vehicle 102 to further increase the accuracy of the GNSS signals and/or the location information that is received by the vehicle 102 from the infrastructural component 104, as described below. In particular, the user's device may use assisted global positioning system (A-GPS) technology, which can use base station or cell towers 132 to provide a faster time to first fix (TTFF), for example, when GNSS signals are poor or unavailable. In another embodiment, the user device may be connected to other electronic devices associated with the vehicle 102, for example, to feed location information from the user device to the onboard unit of the vehicle 102. Depending on the type of electronic devices and available connectors, connections can be made through a serial or universal service bus (USB) cable, as well as a Bluetooth® connection, a compact flash connection, standard (SD) connection, personal computer memory card international association (PCMCIA) connection, an ExpressCard connection, and the like.

Figure 2:
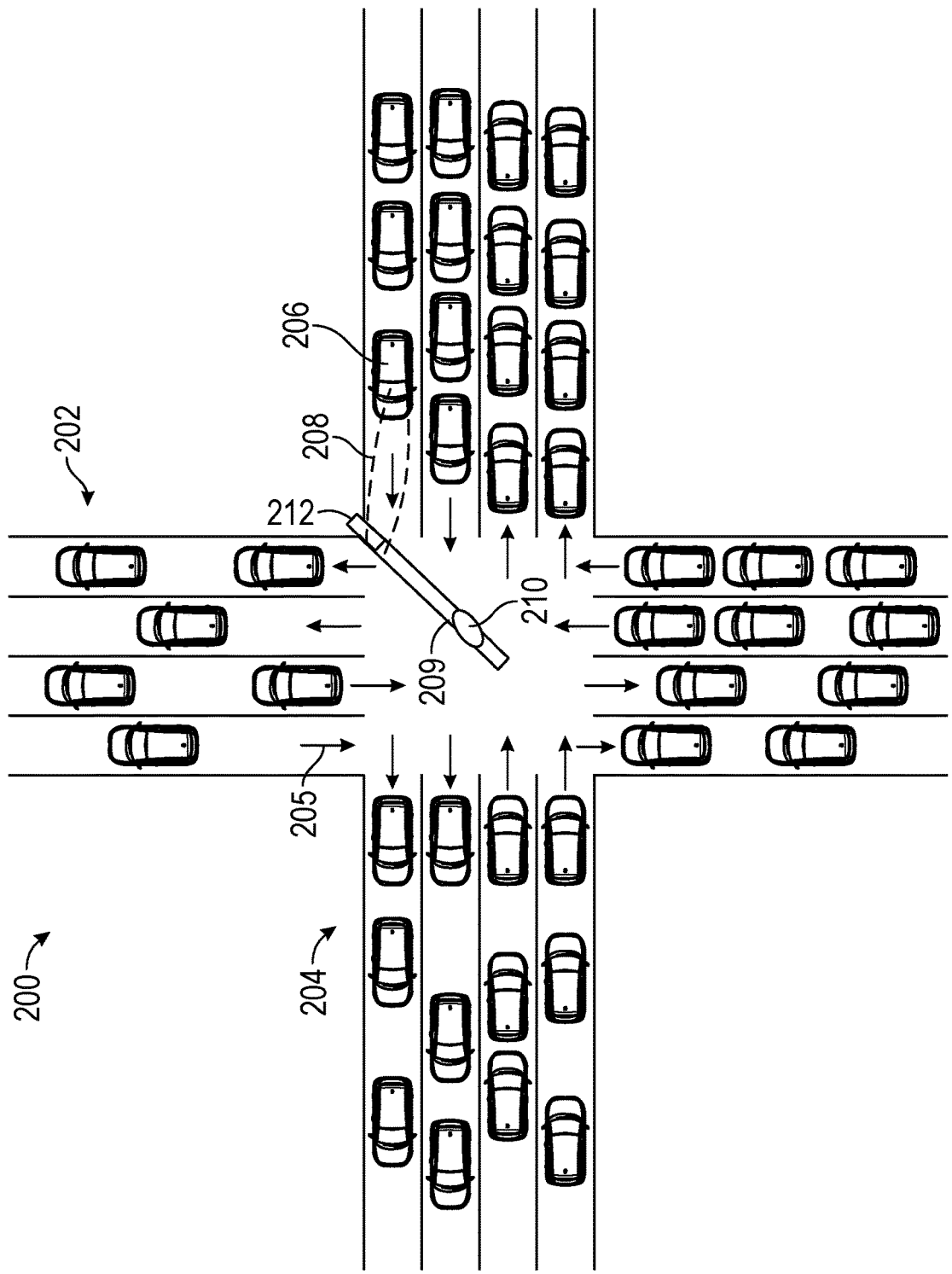
FIG. 2 shows a diagram of another aspect of the environmental context, in accordance with example embodiments of the disclosure.

FIG. 2 shows a diagram of another aspect of the environmental context depicted in FIG. 1, in accordance with example embodiments of the disclosure. In particular, diagram 200 shows streets 202, intersection 204, arrows 205 designating the direction of traffic flow on streets 202, an exemplary vehicle 206, a wireless communication network 208, an infrastructural component 209, camera 210, and roadside unit 212. The vehicle 206, the infrastructural component 209, the camera 210, and the roadside unit 212 may be similar to the vehicle 102, the infrastructural component 104, the roadside unit 120, shown and described in connection with FIG. 1, above.

In particular, diagram 200 serves to illustrate a possible example scenario in which the disclosed systems may increase the accuracy of vehicle positioning systems at an intersection 204. It is to be understood that the example scenarios shown in diagram 200 are not limiting as to the scope of the disclosure's possible applications. Further, diagram 200 shows the presence of multiple vehicles on the roads and intersection 204 as opposed to a single vehicle.

The disclosed systems can uniquely identify a particular vehicle and transmit associated location information for the particular vehicle using modulated radiation, as detailed below. In particular, a given vehicle such as example vehicle 206 can transmit an identification signal using modulated light emitted from its headlights. This modulated light can be detected by the camera 210 of infrastructural component 209. Additionally, the example vehicle 206 can transmit motion information (for example, heading information, speed information, location information as determined by a vehicle's internal sensors and/or GNSS signals, and/or the like) to an antenna of a roadside unit 212 using a communications protocol, such as V2X protocol. The roadside unit 212 can determine the location of the example vehicle 206 based on images of the example vehicle 206 along with the motion information transmitted by example vehicle 206. For example, the roadside unit 212 can determine the location of the vehicle 206 using an image processing technique, as further detailed below. Further, the roadside unit 212 can use the motion information transmitted by the vehicle 206 to determine a timing of image capture via the camera 210. For example, the disclosed systems may estimate an approximate time at which the example vehicle 206 may pass by the camera 210 and may thereby prep the camera 210 to take images of the vehicle 206 accordingly. The roadside unit 212 can then use the motion information transmitted by the vehicle 206 to determine the precise timing for transmitting a determined location information back to the vehicle 206. Moreover, the roadside unit 212 can uniquely identify which vehicle of the many vehicles on the streets 202 to transmit this location information. For example, the roadside unit 212 may determine to transmit the location information to vehicle 206 based on the previously obtained identification signal generated by the modulated radiation of the headlamp of vehicle 206.

In some examples, the infrastructural component 209 may be mechanically and/or electronically coupled to the roadside unit 212. Further, the camera 210 may be mounted on a portion of the infrastructural component 209. In particular, the camera 210 may be positioned to have a relatively unobstructed line of sight to the vehicles crossing the intersection 204.

The camera 210 may include a traffic camera that can be configured to observe vehicular traffic. The camera 210 can be placed along major roads such as highways, freeways, motorways, autoroutes and expressways, as well as arterial roads, and are connected with optical fibers buried alongside or even under the road. The camera 210 may be powered with electricity either provided by mains power in urban areas, or via solar panels or another alternate power source which provides consistent imagery without the threat of a power outage during inclement conditions. The camera 210 may be linked to any suitable network and/or to the Internet. The disclosed systems can receive live video in real time from the cameras 210.

In some examples, the intersection 204 may include a junction where two or more roads meet or cross. Intersections may have any suitable number of road segments, traffic controls, and/or lane design. Intersections generally must manage pedestrian as well as vehicle traffic. Pedestrian aids include crosswalks, pedestrian-directed traffic signals and over/underpasses.

In some examples, the wireless communication network 208 can include a V2X communication network. The V2X communication network can be based on WLAN technology and works directly between vehicles and vehicles (V2V) and traffic infrastructure (V2I), which can form a vehicular ad-hoc network as two V2X senders come within each other's range. In another aspect, the communications can include cellular networks (for example, via cellular-V2X using a PC5 Uu network).

In some examples, the wireless communication network 208 can include any suitable communications networks, wirelessly or wired. Any of the communications networks may include, but are not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The roadside unit 212 can be configured to provide wireless communications from roadside infrastructure to vehicle on-board units. The roadside unit 212 can operate on any suitable communication network at any suitable frequency, for example, a 5.9 GHz V2X band compatible with vehicle systems. The roadside unit 212 can provide for relatively low latency messaging to support high speed events. The roadside unit 212 can be packaged in a ruggedized weatherproof enclosure suitable for outdoor installation in all weather. The roadside unit 212 can be powered using a standard power over Ethernet connection. The roadside unit 212 can provide a local Wi-Fi hot spot for remote communication and/or maintenance. The roadside unit 212 can provide cellular backhaul for data upload and/or download to vehicles. In some examples, the roadside unit 212 can include internal data storage for intersection map geometry. The roadside unit 212 can include hardware security capabilities for secure communication with vehicles. Further, the roadside unit 212 can use the hardware security capabilities to store V2X private keys and for signature generation. In other examples, the roadside unit 212 can serve as a Wi-Fi and/or Bluetooth® hot spot. The roadside unit 212 can have a suitable range (for example, about an 8000-foot range in open-field, line-of-sight conditions).

Figure 3:
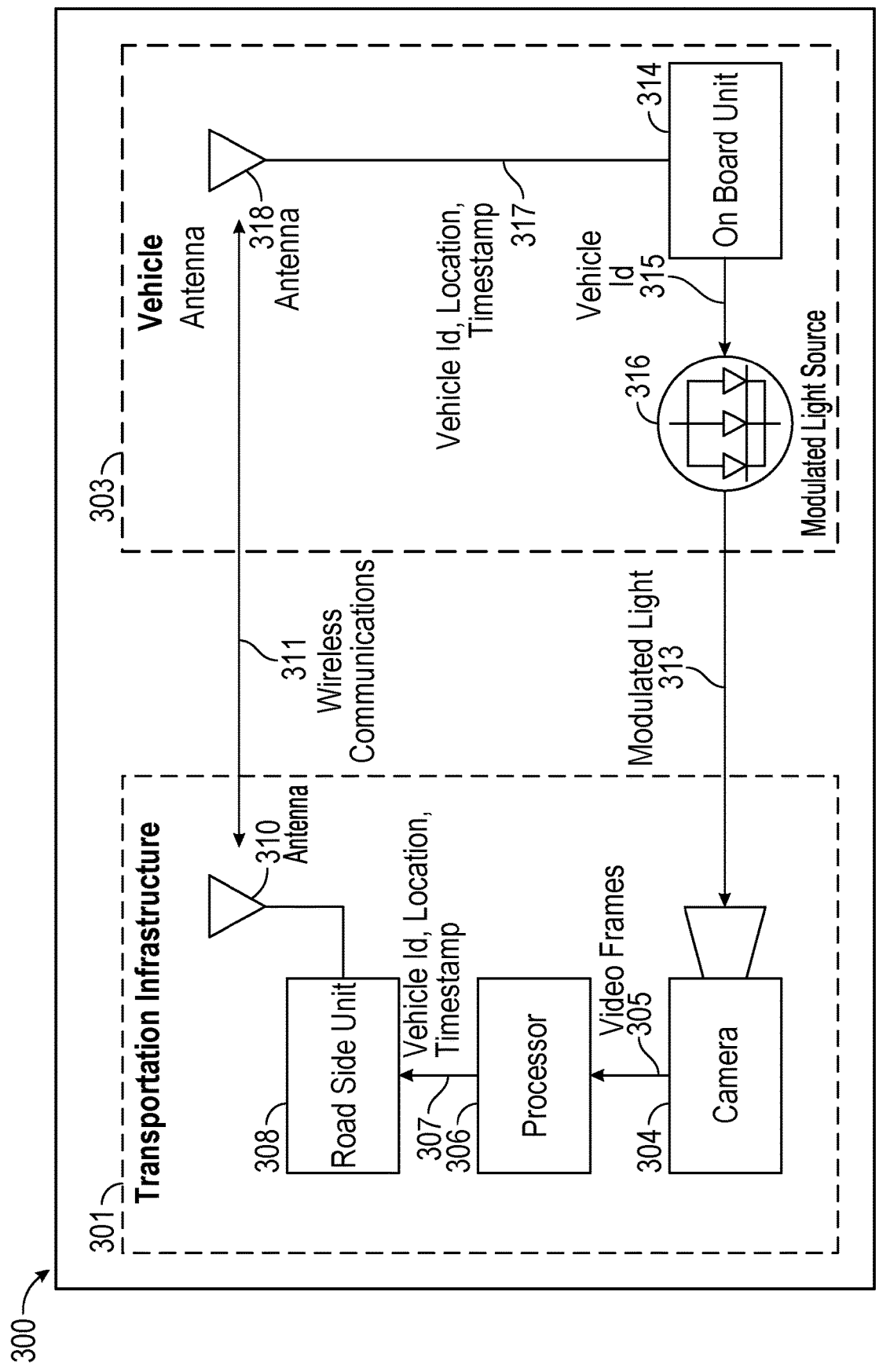
FIG. 3 shows a diagram of example components that may be used for increasing the accuracy of vehicle positioning, in accordance with example embodiments of the disclosure.

FIG. 3 shows a diagram of example components that may be used for increasing the accuracy of vehicle positioning, in accordance with example embodiments of the disclosure. Diagram 300 shows an abstraction of an infrastructure component 301 and a vehicle 303. The infrastructure component 301 may include a camera 304, processor 306, a roadside unit 308, and an antenna 310. These elements may be similar to corresponding elements shown and described in connection with FIG. 1, above. Further, video frames 305 may be transmitted between the camera 304 and the processor 306. Moreover, information 307 including a vehicle's identifier and location along with the timestamp may be transmitted between the processor 306 and the roadside unit 308. As noted, the disclosed systems can uniquely identify a particular vehicle and transmit associated location information for the particular vehicle using the disclosed embodiments. In particular, a given vehicle 303 can transmit an identification signal using modulated light emitted from its headlights. This modulated light can be detected by the camera 304 of infrastructural component 301. Additionally, the example vehicle 303 can transmit motion information (for example, heading information, speed information, location information as determined by a vehicle's internal sensors and/or GNSS signals, and/or the like) to an antenna 310 of a roadside unit 308 using a communications protocol, such as V2X protocol. The roadside unit 308 can determine the location of the example vehicle 303 based on images of the example vehicle 303 along with the motion information transmitted by example vehicle 303. The roadside unit 308 can then use the motion information transmitted by the vehicle 303 to determine the precise timing for transmitting a determined location information back to the vehicle 303.

Video frames 305 may refer to one of the many still images which together compose a video. The video frames 305 may have a corresponding frame rate that may refer to the frequency (rate) at which consecutive images called frames are taken by the camera 304. Frame rate may be expressed in frames per second or fps.

In some examples, the processor 306 may include application processors, various coprocessors, and other dedicated processors for performing delivery analyses. Processor(s) 306 may be communicably coupled with memory (not shown). In some embodiments, processor(s) 306 may include multiple dedicated or shared processors configured to perform signal processing, implement/manage real-time radio transmission operations of a determining a vehicle's locations from the video frames 305 using a computer-implemented algorithm, and the like. The volatile and non-volatile memories found in various embodiments may include storage media for storing information such as processor-readable instructions, data structures, program modules, or other data. Some examples of information that may be stored include basic input/output systems (BIOS), operating systems, and applications.

The vehicle 303 may include an on-board unit 314, a modulated-light source 316, and a vehicle antenna 318. Moreover, the on-board unit 314 may transmit an identifier 315 of the vehicle to the modulated-light source 316. The modulated-light source 316 may transmit modulated light 313 to the camera 304 of the infrastructure component 301. Vehicle antenna 318 may communicate wireless communications 311 to antenna 310 of the infrastructure component 301. These elements may be similar to corresponding elements shown and described in connection with FIG. 1, above.

Figure 4:
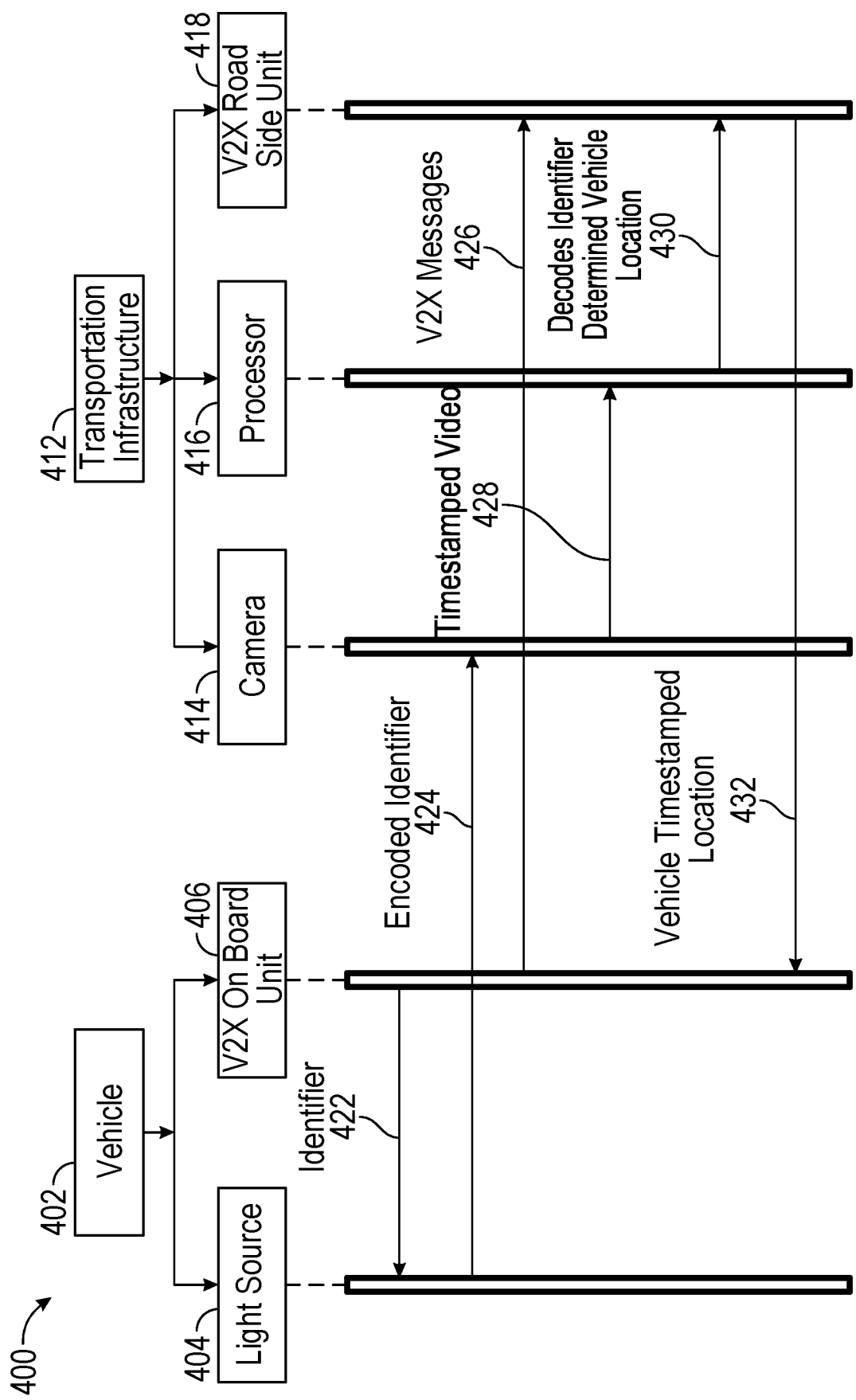
FIG. 4 shows an example sequence diagram illustrating communications between components that may be used for increasing the accuracy of vehicle positioning, in accordance with example embodiments of the disclosure.

FIG. 4 shows an example sequence diagram illustrating communications between components that may be used for the increasing the accuracy of vehicle positioning, in accordance with example embodiments of the disclosure. In particular, diagram 400 represents a sequence diagram between various elements representing abstractions of the vehicle 402 and the infrastructure component 412.

Vehicle 402 may include a modulated-light source 404 and an on-board unit 406. Further, the infrastructure component 412 may include a camera 414, a processor 416, and a roadside unit 418. These elements may be similar to corresponding elements shown and described in connection with FIG. 1, above.

In some examples, the on-board unit 406 may transmit an identifier 422 to modulated-light source 404. As noted, the identifier 422 may include information that identifies the vehicle (for example, the type of vehicle). In some embodiments, the on-board unit 406 may transmit the identifier 422 to the modulated-light source 404 using any suitable protocol and/or vehicle information, such as a control area network (CAN) protocol. In some embodiments, the on-board unit 406 may periodically transmit the identifier 422 to the modulated-light source 404. For example, the on-board unit 406 may transmit the identifier 422 upon the start of a vehicle after performing various vehicle checks. In some embodiments, the modulated-light source 404 may encode the identifier 422 using any suitable modulation technique (for example, an ON-OFF keying modulation (OOK) technique, which can refer to a form amplitude-shift keying (ASK) modulation that represents digital data at the presence or absence of a carrier wave).

The modulated-light source 404 may transmit an encoded identifier 424 to camera 414. In particular, the modulated-light source 404 may broadcast radiation (for example, infrared, visible, and/or ultraviolet radiation) in the environment of the vehicle. The radiation may thus be detected by camera 414, the camera forming a portion of the infrastructure component 412. In some examples, the modulated-light source 404 may generate radiation having characteristics (for example, wavelength, amplitude, and/or phase characteristics) that may be easily detectable by the camera 414 without causing an overload of or interference with camera 414 sensors.

The on-board unit 406 may transmit messages (e.g., V2X messages) to the roadside unit 418. In particular, the messages may include various information associated with the vehicle. Nonlimiting examples of such information includes a heading, a speed, and/or an acceleration information. The roadside unit 418 may receive the messages from the on-board unit 406 and may use this information for determining the vehicle's location. In particular, the information may be inputted to various computer-based algorithms run by a processor 416 of the infrastructure component 412. The information may be used as collected datapoints to update and improve various parameters of measurement models such as Kalman filtering-based models.

The camera 414 may transmit a timestamped video 428 to the processor 416. In particular, the camera 414 may be configured to transmit only a portion of video that is being collected in real time or in near real time by the camera 414. The portion of video may be stored as a timestamp video 428 in memory accessible by the processor 416. The processor 416 may perform any suitable computer-implemented algorithms on the timestamp video 428 to determine a vehicle's location. In particular, the processor 416 may analyze pixels of a given frame of the timestamp video 428 to determine the presence of the vehicle at a location as cross-referenced to internally-stored data. The internally-stored data may include pre-mapped coordinates associated with locations videoed by camera 414. By cross-referencing the frames of the timestamp video 428 with the pre-mapped coordinates associated with the locations, the processor 416 may be able to determine a vehicle's location at a particular time indicated by the timestamp.

The processor 416 may cause to transmit a decoded identifier and a determined vehicle location 432 to the roadside unit 418. In particular, the processor 416 may transmit the decoded identifier and the determined vehicle location using any suitable protocol, such as a CAN-based protocol. The roadside unit 418 may use the decoded identifier to determine which vehicle on the road to transmit the determined vehicle location to. Once the roadside unit 418 has determined which vehicle to transmit to, the roadside unit 418 may load the vehicle location into registries associated with a transceiver that can communicate such information via a wireless link to the vehicle's antenna.

The roadside unit 418 may transmit a timestamped vehicle location 432 to the on-board unit 406. As noted, the roadside unit 418 may transmit the timestamped vehicle's location to an antenna of the vehicle using a transceiver. The timestamped vehicle location may be transmitted in a data frame along with various metadata information in accordance with any suitable protocol, such as a V2X protocol.

Figure 5A:
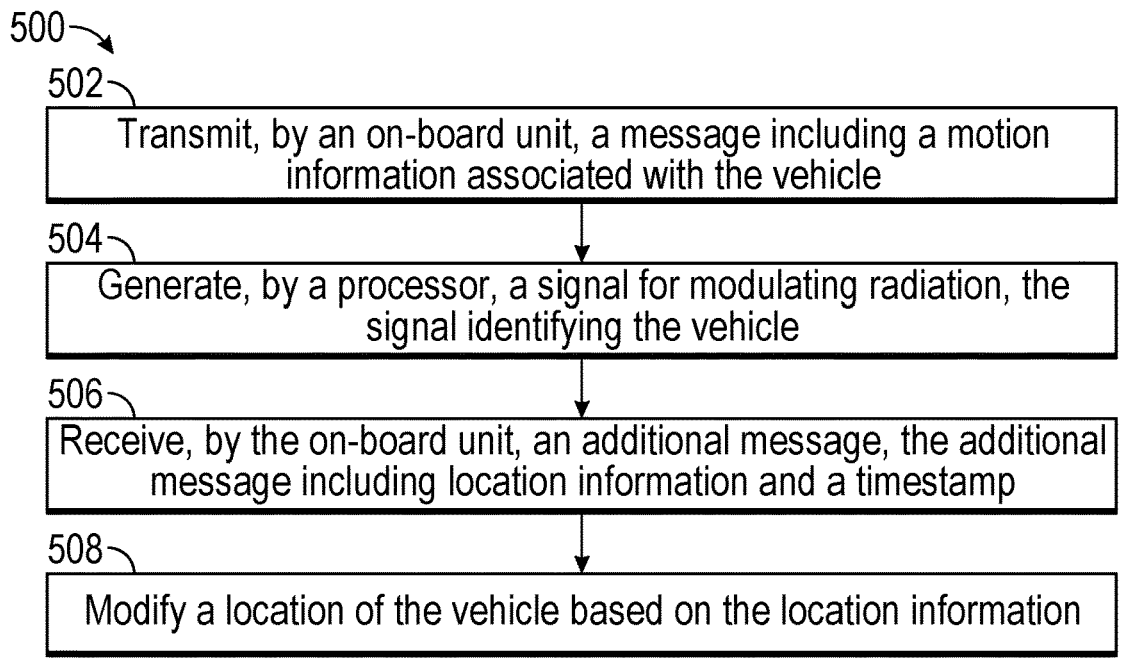
FIGS. 5A and 5B show example process flows describing methods of increasing the accuracy of vehicle positioning, in accordance with example embodiments of the disclosure.

FIG. 5A shows an example process flow describing a method of increasing the accuracy of vehicle positioning, in accordance with example embodiments of the disclosure. At block 502, the method may include transmitting, by an on-board unit, a message including motion information associated with the vehicle. The message can include a V2X message transmitted using a V2X communication protocol. The motion information may include heading information, velocity information, and acceleration information associated with the vehicle. The message may be transmitted using a transceiver having a suitable antenna and in communication with the on-board unit. The message can be transmitted over an air interface to a roadside unit, the roadside unit forming a portion of a transportation infrastructure. The disclosed systems may transmit the message upon the vehicle determining a drift in the vehicle's internal location sensors. Additionally or alternatively, the disclosed systems may transmit the message upon an indication that the vehicle is not receiving a GSS signal of a strength or reception frequency with respect to a predetermined threshold. Further, this step may be optional.

At block 504, the method may include generating, by a processor, a signal for modulating radiation, the signal identifying the vehicle. In some examples, the signal may include a VIN number, a vehicle's make and/or model, and/or the like. The signal may be used in connection with any suitable modulation technique, including, but not limited to, an OOK modulation technique, an OFDM modulation technique, and/or the like. The disclosed systems may use the signal to modulate light at an optical device of the vehicle (for example, headlamps and/or tail lamps of the vehicle). The modulated light may have a predetermined frequency, amplitude, and/or phase based at least in part on the signal.

At block 506, the method may include receiving, by the on-board unit, an additional message, the additional message including location information and a timestamp. In particular, the additional message may be received from the roadside unit. In some examples, the additional message may include V2X message transmitted in accordance with a V2X protocol. In other examples, the timestamp may be obtained using any suitable device, such as a local clock operating on a roadside unit or a global signal obtained from an external network such as the Internet.

At block 508, the method may include modifying a location of the vehicle based on the location information. In particular, the disclosed systems may modify the location of the vehicle in order to increase the accuracy of the location of the vehicle. In some examples, the disclosed systems may modify the location by adjusting the location information based on the vehicle's geometry. For example, the disclosed systems may determine that the vehicle is towing a trailer and/or has a certain shape that may distort the accuracy of the vehicle location. Accordingly, the disclosed systems may apply a further correction factor to the received location information to modify the location of the vehicle. The disclosed systems can then modify the location based on the adjusted location information. The modified location can have an accuracy of about one and a half meters at a confidence level of about 95%.

Figure 5B:
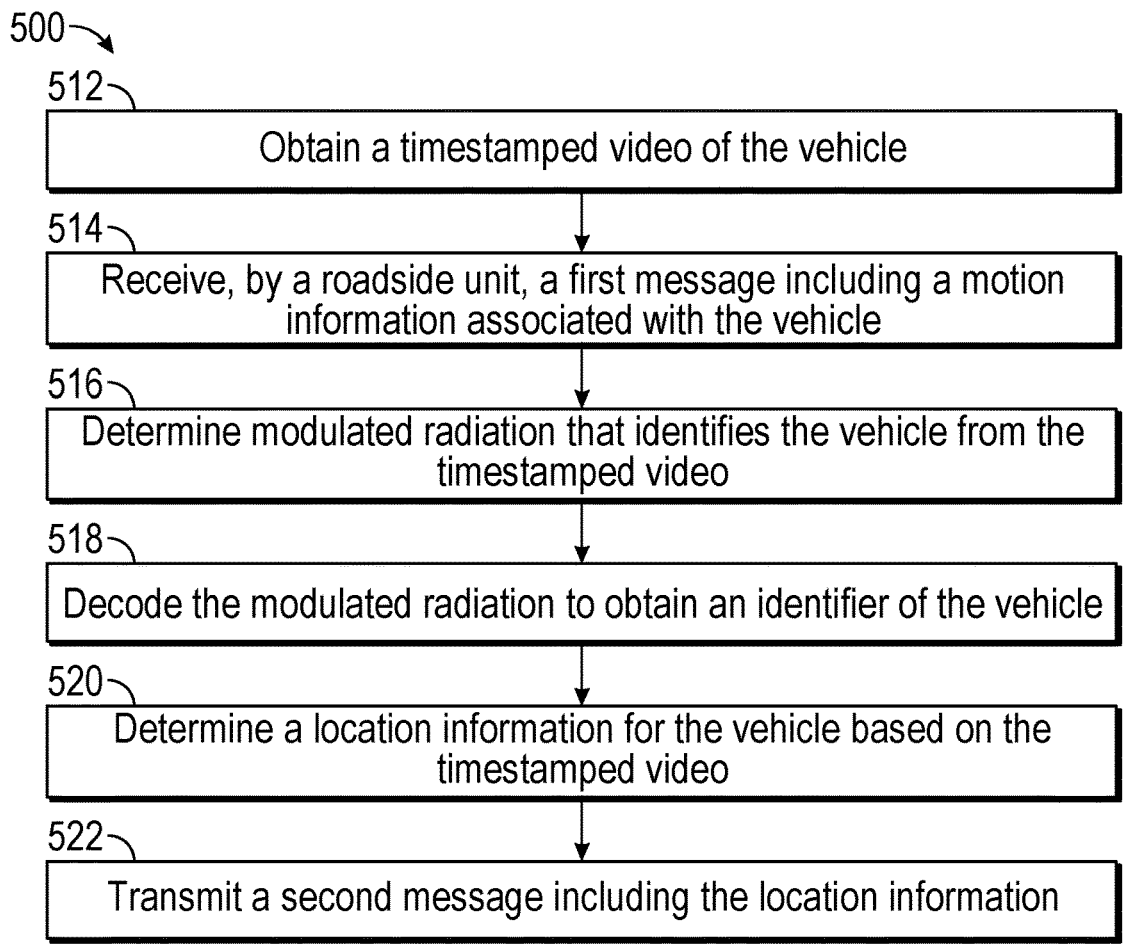

FIG. 5B shows an example process flow describing a method of increasing the accuracy of vehicle positioning, in accordance with example embodiments of the disclosure. At block 512, the method may include obtaining a timestamped video of the vehicle. In some examples, the disclosed systems may obtain the timestamp video using a camera that may be mounted on a roadside unit and/or an infrastructural component. In other examples, the timestamped video may be received in a live fashion, and the disclosed systems may edit portions of the video prior to performing the operations detailed below. For example, the disclosed systems may reduce the file size of the video to facilitate more efficient processing.

At block 514, the method may include receiving, by a roadside unit, a first message including motion information associated with the vehicle. In some examples, the roadside unit can receive the first message using an antenna configured to communicate with an antenna of the vehicle. In other examples, the first message may be received in accordance with a suitable standard, such as a V2X standard. In some examples, the disclosed systems may use the motion information to trigger and/or time the determination of the location of the vehicle. This step may be optional.

At block 516, the method may include determining modulated radiation that identifies the vehicle from the timestamped video. In some examples, the disclosed systems may demodulate the radiation using image processing on frames of the timestamped video. In particular, the disclosed systems may perform any suitable computer-implemented technique (for example, machine vision algorithms) to demodulate the radiation in the timestamped video. As a result, the disclosed systems may obtain a frequency, phase, and/or an amplitude of the originally modulated radiation.

At block 518, the method may include decoding the modulated radiation to obtain an identifier of the vehicle. In some examples, the disclosed systems may use a lookup table or query a database to determine a given identifier based on a characteristic of the modulated radiation. The characteristic can include, for example, an amplitude, frequency, and/or a phase of the originally modulated radiation.

At block 520, the method may include determining a location information for the vehicle based on the timestamped video. In some examples, the disclosed systems may have predetermined maps associated with the region in the field of view of a camera that obtained the timestamped video. Accordingly, the disclosed systems may compare pixels of the frames of the timestamped video with the map information to locate the vehicle. In some embodiments, determining the location information can include determining a vehicle geometry based on the identifier, and determining the location information based on the vehicle's geometry, a road geometry, and the timestamped video.

At block 522, the method may include transmitting a second message including the location information. In some examples, the roadside unit can transmit the second message using an antenna configured to communicate with an antenna of the vehicle. In other examples, the message may be transmitted in accordance with a suitable standard, such as a V2X standard.

Further, as noted, embodiments of devices and systems (and their various components) described herein can employ artificial intelligence (AI) to facilitate automating one or more features described herein. The components can employ various AI-based schemes for carrying out various embodiments and/or examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources (e.g., different sensor inputs). Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=\text{confidence(class)}$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 6:
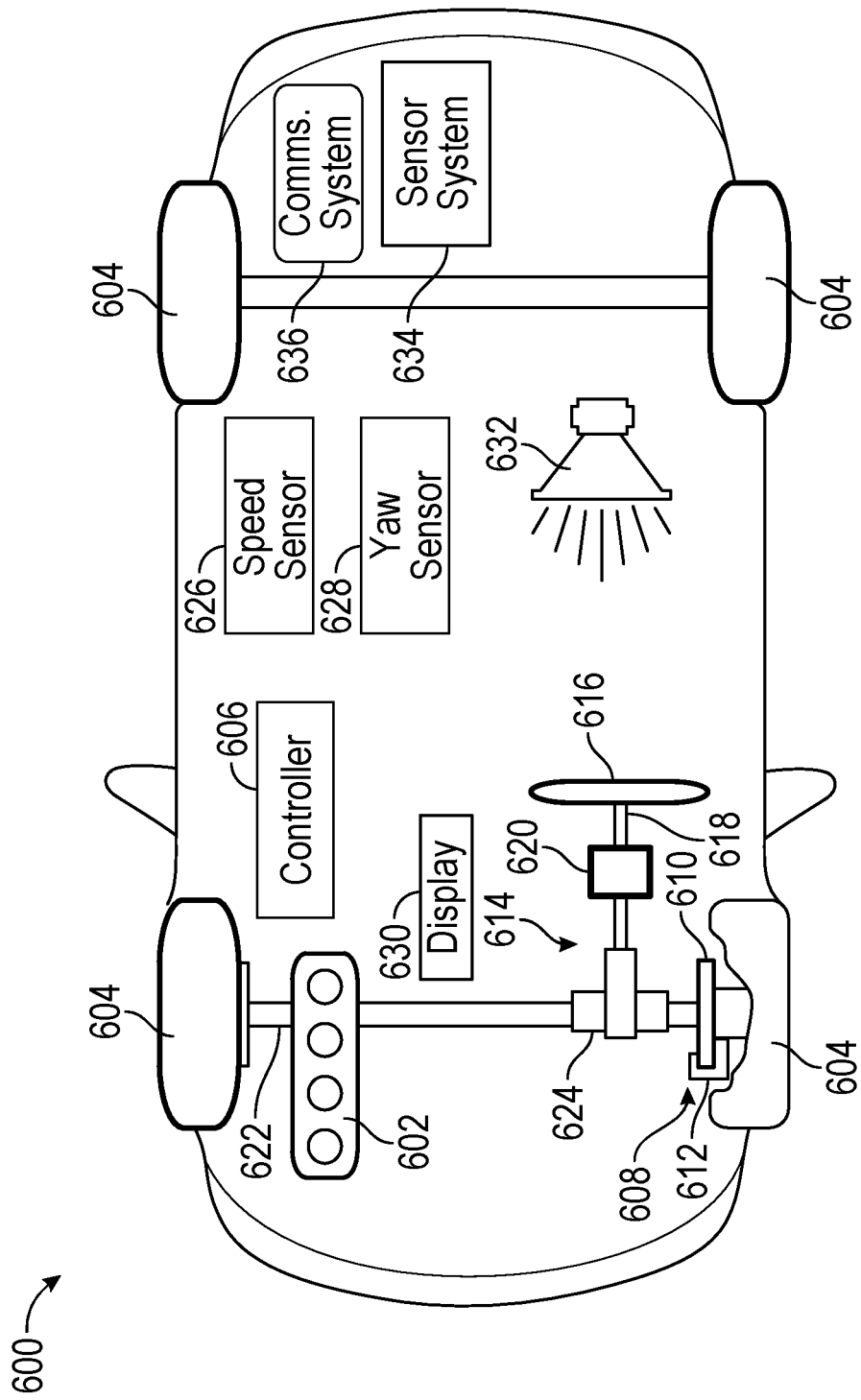
FIG. 6 is a schematic illustration of an example AV that can be positioned using the disclosed systems and methods, in accordance with one or more embodiments of the disclosure.

FIG. 6 is a schematic illustration of an example autonomous vehicle, in accordance with one or more embodiments of the disclosure. As noted, the vehicle (for example, vehicle 102 shown and described in connection with FIG. 1, above), may include an AV. In some examples, an AV may be particularly dependent on accurate location information for navigation, collision avoidance, and general safety purposes. Accordingly, the disclosed systems may be used to improve the accuracy of the location of such an AV using the various operations described above. Referring to FIG. 6, an example vehicle 600 may include a power plant 602 (such as a combustion engine and/or an electric motor) that provides torque to driven wheels 604 that propel the vehicle forward or backward.

Autonomous vehicle operation, including propulsion, steering, braking, navigation, and the like, may be controlled autonomously by a vehicle controller 606. For example, the vehicle controller 606 may be configured to receive feedback from one or more sensors (for example, sensor system 634, etc.) and other vehicle components to determine road conditions, vehicle positioning, and so forth. The vehicle controller 606 may also ingest data form various sensors such as speed monitor and yaw sensor, as well as the tires, brakes, motor, and other vehicle components. The vehicle controller 606 may use the feedback and route/map data of the route to determine actions to be taken by the autonomous vehicle, which may include operations related to the engine, steering, braking, and so forth. Control of the various vehicle systems may be implemented using any suitable mechanical means, such as servo motors, robotic arms (for example, to control steering wheel operation, acceleration pedal, brake pedal, etc.), and so forth. The controller 606 may be configured to interact with the user by communicating with the user's user device.

The vehicle controller 606 may include one or more computer processors coupled to at least one memory. The vehicle 600 may include a braking system 608 having disks 610 and calipers 612. The vehicle 600 may include a steering system 614. The steering system 614 may include a steering wheel 616, a steering shaft 618 interconnecting the steering wheel to a steering rack 620 (or steering box). The front and/or rear wheels 604 may be connected to the steering rack 620 via axle 622. A steering sensor 624 may be disposed proximate the steering shaft 618 to measure a steering angle. The vehicle 600 also includes a speed sensor 626 that may be disposed at the wheels 604 or in the transmission. The speed sensor 626 is configured to output a signal to the controller 606 indicating the speed of the vehicle. A yaw sensor 628 is in communication with the controller 606 and is configured to output a signal indicating the yaw of the vehicle 600.

The vehicle 600 includes a cabin having a display 630 in electronic communication with the controller 606. The display 630 may be a touchscreen that displays information to the passengers of the vehicle and/or functions as an input. A person having ordinary skill in the art will appreciate that many different display and input devices are available and that the present disclosure is not limited to any particular display. An audio system 632 may be disposed within the cabin and may include one or more speakers for providing information to users that pickup items. The audio system 632 may also include a microphone for receiving voice inputs or detecting sounds at the residence (for example, animal sounds). The vehicle may include a communications system 636 that is configured to send and/or receive wireless communications via one or more networks. The communications system 636 may be configured for communication with devices in the car or outside the car, such as a user's device, the delivery vehicles, etc.

The vehicle 600 may also include a sensor system for sensing areas external to the vehicle. The sensor system may include a plurality of different types of sensors and devices such as cameras, ultrasonic sensors, RADAR, LIDAR, and/or combinations thereof. The sensor system may be in electronic communication with the controller 606 for controlling the functions of various components. The controller may communicate via a serial bus or via dedicated electrical conduits. The controller generally includes any number of microprocessors, ASICs, ICs, memory (for example, FLASH, ROM, RAM, EPROM and/or EEPROM) and software code to co-act with one another to perform a series of operations. The controller also includes predetermined data, or "look up tables" that are based on calculations and test data and are stored within the memory. The controller may communicate with other vehicle systems and controllers over one or more wired or wireless vehicle connections using common bus protocols (for example, CAN and LIN). Used herein, a reference to "a controller" refers to one or more controllers and/or computer processors. The controller 606 may receive signals from the sensor system 634 and may include memory containing machine-readable instructions for processing the data from the sensor system. The controller 606 may be programmed to output instructions to at least the display 630, the audio system 632, the steering system 614, the braking system 608, and/or the power plant 602 to autonomously operate the vehicle 600.

Figure 7:
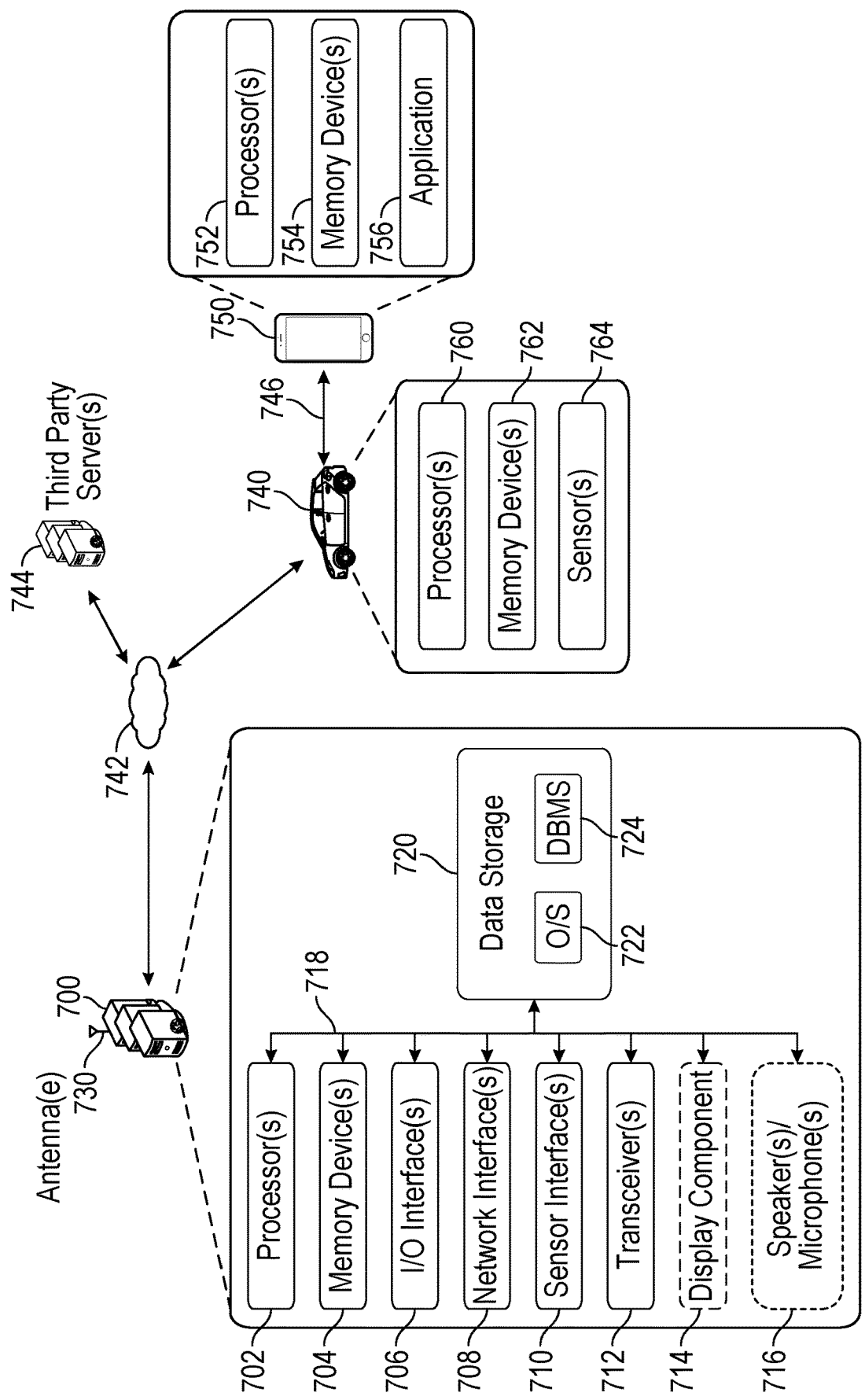
FIG. 7 is a schematic illustration of an example server architecture for one or more servers that can be used for increasing the accuracy of vehicle positioning, in accordance with one or more embodiments of the disclosure.

FIG. 7 is a schematic illustration of an example server architecture for one or more server(s) 700 in accordance with one or more embodiments of the disclosure. The server 700 illustrated in the example of FIG. 7 may correspond to a server that may be used by a vehicle (for example, vehicle 102 as shown and described in connection with FIG. 1, above) on a network associated with the vehicle, a delivery vehicle, or a user device. In an embodiment, the server 700 may include a cloud-based server that may serve to store and transmit information (for example, images and video of a user, a user residence, and the like). Some or all of the individual components may be optional and/or different in various embodiments. In some embodiments, at least one of the servers described FIG. 7 may be located at an autonomous vehicle.

The server 700 may be in communication with an AV 740, and one or more user devices 750. The AV 740 may be in communication with the one or more user devices 750. Further, the server 700, the AV 740, and/or the user devices 750 may be configured to communicate via one or more networks 742. The AV 740 may additionally be in wireless communication over one or more network(s) 742 with the user devices 750 via a connection protocol such as Bluetooth® or NFC. Such network(s) 742 may include, but are not limited to, any one or more different types of communications networks such as, for example, cable networks, public networks (for example, the Internet), private networks (for example, frame-relay networks), wireless networks, cellular networks, telephone networks (for example, a public switched telephone network), or any other suitable private or public packet-switched or circuit-switched networks. Further, such network(s) may have any suitable communication range associated therewith. In addition, such network(s) may include communication links and associated networking devices (for example, link-layer switches, routers, etc.) for transmitting network traffic over any suitable type of medium including, but not limited to, coaxial cable, twisted-pair wire (for example, twisted-pair copper wire), optical fiber, a HFC medium, a microwave medium, a radio frequency communication medium, a satellite communication medium, or any combination thereof.

In an illustrative configuration, the server 700 may include one or more processors 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display components 714, one or more optional speakers(s)/camera(s)/microphone(s) 716, and data storage 720. The server 700 may further include one or more bus(es) 718 that functionally couple various components of the server 700. The server 700 may further include one or more antenna(e) 730 that may include, without limitation, a cellular antenna for transmitting or receiving signals to/from a cellular network infrastructure, a GNSS antenna for receiving GNSS signals from a GNSS satellite, a Bluetooth® antenna for transmitting or receiving Bluetooth® signals, a NFC antenna for transmitting or receiving NFC signals, and so forth. These various components will be described in more detail hereinafter.

The bus(es) 718 may include at least one of a system bus, a memory bus, an address bus, or a message bus, and may permit the exchange of information (for example, data (including computer-executable code), signaling, etc.) between various components of the server 700. The bus(es) 718 may include, without limitation, a memory bus or a memory controller, a peripheral bus, an accelerated graphics port, and so forth. The bus(es) 718 may be associated with any suitable bus architecture.

The memory 704 of the server 700 may include volatile memory (memory that maintains its state when supplied with power) such as RAM and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

The data storage 720 may include removable storage and/or non-removable storage including, but not limited to, magnetic storage, optical disk storage, and/or tape storage. The data storage 720 may provide non-volatile storage of computer-executable instructions and other data.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. More specifically, the data storage 720 may store one or more operating systems (O/S) 722; one or more database management systems (DBMS) 724; and one or more program module(s), applications, engines, computer-executable code, scripts, or the like. Some or all of these component(s) may be sub-component(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The processor(s) 702 may be configured to access the memory 704 and execute the computer-executable instructions loaded therein. For example, the processor(s) 702 may be configured to execute the computer-executable instructions of the various program module(s), applications, engines, or the like of the server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit.

Referring now to other illustrative components depicted as being stored in the data storage 720, the O/S 722 may be loaded from the data storage 720 into the memory 704 and may provide an interface between other application software executing on the server 700 and the hardware resources of the server 700.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (for example, relational model, object model, etc.) and may support any of a variety of query languages.

Referring now to other illustrative components of the server 700, the input/output (I/O) interface(s) 706 may facilitate the receipt of input information by the server 700 from one or more I/O devices as well as the output of information from the server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 706 may also include a connection to one or more of the antenna(e) 730 to connect to one or more networks via a wireless local area network (WLAN) (such as Wi-Fi) radio, Bluetooth®, Zigbee$^{SM}$, and/or a wireless network radio, such as a radio capable of communication with a wireless communication network, such as a Long Term Evolution (LTE) network, WiMAX network, 3G network, a Zigbee$^{SM}$ network, etc.

The server 700 may further include one or more network interface(s) 708 via which the server 700 may communicate with any of a variety of other systems, platforms, networks, devices, and so forth. The network interface(s) 708 may enable communication, for example, with one or more wireless routers, one or more host servers, one or more web servers, and the like via one or more networks.

The sensor(s)/sensor interface(s) 710 may include or may be capable of interfacing with any suitable type of sensing device such as, for example, inertial sensors, force sensors, thermal sensors, photocells, and so forth.

The display component(s) 714 may include one or more display layers, such as LED or LCD layers, touch screen layers, protective layers, and/or other layers. The optional camera(s) of the speakers(s)/camera(s)/microphone(s) 716 may be any device configured to capture ambient light or images. The optional microphone(s) of the speakers(s)/camera(s)/microphone(s) 716 may be any device configured to receive analog sound input or voice data. The microphone(s) of the speakers(s)/camera(s)/microphone(s) 716 may include microphones used to capture sound.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module.

It should further be appreciated that the server 700 may include alternate and/or additional hardware, software, or firmware components beyond those described or depicted without departing from the scope of the disclosure.

The user device 750 may include one or more computer processor(s) 752, one or more memory devices 754, and one or more applications, such as a vehicle application 756. Other embodiments may include different components.

The processor(s) 752 may be configured to access the memory 754 and execute the computer-executable instructions loaded therein. For example, the processor(s) 752 may be configured to execute the computer-executable instructions of the various program module(s), applications, engines, or the like of the device to cause or facilitate various operations to be performed in accordance with one or more embodiments of the disclosure. The processor(s) 752 may include any suitable processing unit capable of accepting data as input, processing the input data in accordance with stored computer-executable instructions, and generating output data. The processor(s) 752 may include any type of suitable processing unit.

The memory 754 may include volatile memory (memory that maintains its state when supplied with power). Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

Referring now to functionality supported by the user device 750, the AV application 756 may be a mobile application executable by the processor 752 that can be used to present options and/or receive user inputs of information related to the disclosed embodiments. In addition, the user device 750 may communicate with the AV 740 via the network 742 and/or a direct connection, which may be a wireless or wired connection. The AV 740 may additionally be in wireless communication 746 with the user device 750 via a connection protocol such as Bluetooth® or Near Field Communication. The user device 750 may include a camera, scanner, bio reader or the like to capture biometric data of a user, perform certain processing step on the biometric date, such as extracting features from captures biometric data, and then communicate those extracted features to one or more remote servers, such as one or more of cloud-based servers.

The AV 740 may include one or more computer processor(s) 760, one or more memory devices 762, one or more sensors 764, and one or more applications, such as an autonomous driving application 766. Other embodiments may include different components. A combination or sub combination of these components may be integral to the controller 606 in FIG. 6.

The processor(s) 760 may be configured to access the memory 762 and execute the computer-executable instructions loaded therein. For example, the processor(s) 760 may be configured to execute the computer-executable instructions of the various program module(s), applications, engines, or the like of the device to cause or facilitate various operations to be performed in accordance with one or more embodiments of the disclosure. The processor(s) 760 may include any suitable processing unit capable of accepting data as input, processing the input data in accordance with stored computer-executable instructions, and generating output data. The processor(s) 760 may include any type of suitable processing unit.

The memory 762 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module.

It should further be appreciated that the server 700 may include alternate and/or additional hardware, software, or firmware components beyond those described or depicted without departing from the scope of the disclosure.

Example embodiments of the disclosure may include one or more of the following examples:

In a first example 1, a method for locating a vehicle can include: transmitting, by an on-board unit, a message including a motion information associated with the vehicle; transmitting, by a processor, a signal comprising modulating radiation, the signal identifying the vehicle; receiving, by the on-board unit, an additional message, the additional message including location information and a timestamp; and determining a location of the vehicle based on the location information.

In an example 2, and/or some other example herein, at least one of the message or the additional message comprises a vehicle-to-everything (V2X) message transmitted using a V2X communication protocol.

In an example 3, and/or some other example herein, the determining the location can further include: changing the location information based on the vehicle's geometry; and determining the location based on the changed location information.

In an example 4, and/or some other example herein, the method can further include encoding, by a modulated-light source, identifying information into the signal.

In an example 5, and/or some other example herein, the modulated-light source can include a headlight or a back light of the vehicle.

In an example 6, and/or some other example herein, the modulated-light source can broadcast the radiation and the radiation is not visible to a human eye.

In an example 7, and/or some other example herein, the motion information can include at least one of a heading of the vehicle, a speed of the vehicle, or an acceleration of the vehicle.

In an example 8, and/or some other example herein, the transmitting the message can include at least one of: a determination of a drift in the vehicle's internal location sensors, or a determination that the vehicle receiving a location signal of a strength or reception frequency below respective thresholds.

In an example 9, a method for locating a vehicle can include: obtaining a timestamped video of the vehicle; receiving, by a roadside unit, a first message including a motion information associated with the vehicle; determining modulated radiation that identifies the vehicle from the video; decoding the modulated radiation to obtain an identifier of the vehicle; determining a location information for the vehicle based on the video; and transmitting a second message including the location information.

In an example 10, and/or some other example herein, at least one of the message or the second message can include a V2X message transmitted using a V2X communication protocol.

In an example 11, and/or some other example herein, the obtaining the video may include capturing, by a camera, the video in a field of view of the camera.

In an example 12, and/or some other example herein, the determining the location information can further include: determining a vehicle geometry based on the identifier; and determining the location information based on the vehicle's geometry, a road geometry, and the video.

In an example 13, a system for locating a vehicle can include: at least one memory device that stores computer-executable instructions; and at least one processor configured to access the at least one memory device, wherein the processor is configured to execute the computer-executable instructions to: transmit, by an on-board unit, a message including a motion information associated with the vehicle; transmit, by the processor, a signal comprising modulating radiation, the signal identifying the vehicle; receive, by the on-board unit, an additional message, the additional message including location information and a timestamp; and determine a location of the vehicle based on the location information.

In an example 14, and/or some other example herein, at least one of the message or the additional message can include a V2X message transmitted using a V2X communication protocol.

In an example 15, and/or some other example herein, the determining the location can include changing the location information based on the vehicle's geometry; and determining the location based on the changed location information.

In an example 16, and/or some other example herein, the processor can be further configured to execute the computer-executable instructions to encode, by a modulated light source, identifying information into the signal.

In an example 17, and/or some other example herein, the processor can be further configured to execute the computer-executable instructions to: obtain a video of the vehicle; receive, by a roadside unit, a first message including a motion information associated with the vehicle; determine modulated radiation that identifies the vehicle from the video; decode the modulated radiation to obtain an identifier of the vehicle; determine a location information for the vehicle based on the video and the motion information; and transmit a second message including the location information.

In an example 18, and/or some other example herein, at least one of the first message or the additional message comprises a V2X message transmitted using a V2X communication protocol.

In an example 19, and/or some other example herein, the obtaining the video comprises capturing, by a camera, the video in a field of view of the camera.

In an example 20, and/or some other example herein, the determining the location information further includes: determining a vehicle geometry based on the identifier; and determining the location information based on the vehicle's geometry, a road geometry, and the video.

Example 21 may include an apparatus comprising means for performing a method as claimed in any of the preceding examples.

Example 22 may include machine-readable storage including machine-readable instructions, when executed, to implement a method as claimed in any preceding example.

Example 23 may include machine-readable storage including machine-readable instructions, when executed, to implement a method or realize an apparatus as claimed in any preceding example.

Example 24 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 25 may include an apparatus comprising logic, modules, and/or circuitry to perform one or more elements of a method described in or related to any of examples 1-20, or any other method or process described herein.

Example 26 may include a method, technique, or process as described in or related to any of examples 1-20, or portions or parts thereof.

Example 27 may include an apparatus comprising: one or more processors and one or more computer readable media comprising instructions that, when executed by the one or more processors, cause the one or more processors to perform the method, techniques, or process as described in or related to any of examples 1-20, or portions thereof.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for locating a vehicle, comprising:
   obtaining a timestamped video of the vehicle;
   transmitting, by an on-board unit comprising a controller, a first message including a motion information associated with the vehicle;
   encoding, by a modulated-light source, identifying information and a timestamp of the timestamped video into a signal;
   transmitting, by a processor, the signal comprising modulating radiation associated with the vehicle from the timestamped video, the signal identifying the vehicle;
   receiving, by the on-board unit, a second message, the second message including location information and a timestamp, wherein the second message comprises a determination of a drift in internal location sensors of the vehicle at a time associated with the timestamp;
   determining an actual location of the vehicle based on the location information, wherein at least one of the first message or the second message comprises a vehicle-to-everything (V2X) message transmitted using a V2X communication protocol;
   determining a correction factor based on a difference between the actual location of the vehicle and a global navigation satellite systems (GNSS) based location of the vehicle; and
   applying the correction factor to the GNSS-based location of the vehicle.

2. The method of claim 1, wherein determining the location further comprises:
   changing the location information based on a geometry of the vehicle, wherein the geometry of the vehicle comprises a shape of the vehicle; and
   determining the actual location based on the location information.

3. The method of claim 1, wherein the modulated-light source comprises a headlight or a back light of the vehicle.

4. The method of claim 1, wherein the modulated-light source broadcasts the modulating radiation and the modulating radiation is not visible to a human eye.

5. The method of claim 1, wherein the motion information comprises at least one of a heading of the vehicle, a speed of the vehicle, or an acceleration of the vehicle.

6. The method of claim 1, wherein the second message further comprises a determination that the vehicle receiving a location signal of a strength or reception frequency below respective thresholds.

7. The method of claim 1, wherein the first message comprises at least one of: a temporary identifier, a latitude of the vehicle, a longitude of the vehicle, an elevation of the vehicle, a speed of the vehicle, a heading of the vehicle, an acceleration of the vehicle, a yaw of the vehicle, a brake system status of the vehicle, a type of the vehicle, or a trailer information of the vehicle.

8. A method for locating a vehicle, comprising:
   obtaining a timestamped video of the vehicle;
   receiving, by a roadside unit comprising a camera, a first message including a motion information associated with the vehicle;
   determining modulated radiation associated with the vehicle and a timestamp from the time stamped video;
   decoding the modulated radiation to obtain an identifier of the vehicle;
   determining a location information for the vehicle based on the timestamped video and the motion information;
   transmitting a second message including the location information and an indication of the identifier, wherein the second message comprises a determination of a drift in internal location sensors of the vehicle at a time associated with the timestamp;
   determining an actual location of the vehicle based on the location information, wherein at least one of the first message or the second message comprises a vehicle-to-everything (V2X) message transmitted using a V2X communication protocol;

determining a correction factor based on a difference between the actual location of the vehicle and a global navigation satellite systems (GNSS) based location of the vehicle; and applying the correction factor to the GNSS-based location of the vehicle.

9. The method of claim 8, wherein obtaining the timestamped video comprises capturing, by a camera, the timestamped video in a field of view of the camera.

10. The method of claim 8, wherein determining the location information further comprises:

determining a vehicle geometry based on the identifier, wherein the vehicle geometry comprises a shape of the vehicle; and determining the location information based on the vehicle geometry, a road geometry, and the timestamped video.

11. The method of claim 8, wherein the first message comprises at least one of: a temporary identifier, a latitude of the vehicle, a longitude of the vehicle, an elevation of the vehicle, a speed of the vehicle, a heading of the vehicle, an acceleration of the vehicle, a yaw of the vehicle, a brake system status of the vehicle, a type of the vehicle, or a trailer information of the vehicle.

12. A system for locating a vehicle, comprising:

at least one memory device that stores computer-executable instructions; and at least one processor configured to access the at least one memory device, wherein the processor is configured to execute the computer-executable instructions to:

obtain a timestamped video of the vehicle;

transmit, by an on-board unit comprising a controller, a first message including a motion information associated with the vehicle;

encode, by a modulated light source, identifying information and a timestamp of the timestamped video into a signal;

transmit, by the processor, the signal comprising modulating radiation associated with the vehicle from the timestamped video, the signal identifying the vehicle;

receive, by the on-board unit, a second message, the second message including location information and a timestamp, wherein the second message comprises a determination of a drift in internal location sensors of the vehicle at a time associated with the timestamp;

determine an actual location of the vehicle based on the location information, wherein at least one of the first message or the second message comprises a vehicle-to-everything (V2X) message transmitted using a V2X communication protocol;

determine a correction factor based on a difference between the actual location of the vehicle and a global navigation satellite systems (GNSS) based location of the vehicle; and apply the correction factor to the GNSS-based location of the vehicle.

13. The system of claim 12, wherein determining the location further comprises:

changing the location information based on a geometry of the vehicle, wherein the geometry of the vehicle comprises a shape of the vehicle; and determining the actual location based on the location information.

14. The system of claim 12, wherein the processor is further configured to execute the computer-executable instructions to:

receive, by a roadside unit comprising a camera, the first message including the motion information associated with the vehicle;

determine modulated radiation that identifies the vehicle from the video;

decode the modulated radiation to obtain an identifier of the vehicle;

determine the location information for the vehicle based on the video and motion information; and transmit the second message including the location information.

15. The system of claim 12, wherein the second message comprises a timestamped video in a field of view of a camera that is captured by the camera.

16. The system of claim 15, wherein determining the location information further comprises:

determining a vehicle geometry based on the identifier, wherein the geometry of the vehicle comprises a shape of the vehicle; and determining the location information based on the vehicle geometry, a road geometry, and the timestamped video.

17. The system of claim 12, wherein the first message comprises at least one of: a temporary identifier, a latitude of the vehicle, a longitude of the vehicle, an elevation of the vehicle, a speed of the vehicle, a heading of the vehicle, an acceleration of the vehicle, a yaw of the vehicle, a brake system status of the vehicle, a type of the vehicle, or a trailer information of the vehicle.

* * * * *